United States Patent [19]
Fujisawa et al.

[11] Patent Number: 5,704,771
[45] Date of Patent: Jan. 6, 1998

[54] VIBRATING COMPRESSOR

[75] Inventors: Yoshiaki Fujisawa; Junji Yoshihara; Naoya Kawakami; Hiroyuki Kainuma; Yukio Morita; Hironobu Suga, all of Nitta-machi, Japan

[73] Assignee: Sawafuji Electric Co., Ltd., Tokyo, Japan

[21] Appl. No.: 657,055

[22] Filed: May 28, 1996

[30] Foreign Application Priority Data

| May 31, 1995 | [JP] | Japan | 7-133010 |
| May 31, 1995 | [JP] | Japan | 7-133011 |

[51] Int. Cl.[6] .................................................. F04B 17/03
[52] U.S. Cl. ............................................................ 417/417
[58] Field of Search .................................. 417/417, 552, 417/363, 547; 310/27

[56] References Cited

U.S. PATENT DOCUMENTS

| 3,597,122 | 8/1971 | Farmer | 417/417 |
| 3,781,140 | 12/1973 | Gladden | 417/326 |
| 3,814,550 | 6/1974 | Adams | 417/417 |
| 3,842,809 | 10/1974 | King | 417/417 |
| 3,903,438 | 9/1975 | Dolz | 310/27 |
| 4,027,211 | 5/1977 | Omura et al. | 417/417 |
| 4,121,125 | 10/1978 | Dolz | 310/27 |
| 4,374,330 | 2/1983 | Fey | 417/415 |
| 4,416,594 | 11/1983 | Ichikawa | 417/417 |
| 4,427,906 | 1/1984 | Kainuma et al. | 417/416 |
| 4,632,645 | 12/1986 | Kawakami et al. | 417/417 |
| 5,275,542 | 1/1994 | Terauchi | 417/417 |
| 5,509,792 | 4/1996 | Sullivan et al. | 417/417 |

*Primary Examiner*—Timothy Thorpe
*Assistant Examiner*—Peter G. Korytnyk
*Attorney, Agent, or Firm*—McGlew & Tuttle

[57] ABSTRACT

A vibrating compressor having a housing with an inner tube and an outer tube formed concentrically. The inner tube is connected with the outer tube via an end plate. The end plate being disposed at one axial end of the inner tube and the outer tube to form a housing closed end and a housing open end. A permanent magnet is fitted to an inner circumferential surface of the outer tube. A driving coil is provided in a gap between the permanent magnet and the inner tube. A cylinder is fitted into an inside of the inner tube and a hollow piston equipped with a valve is inserted into the cylinder. The hollow piston is connected to the driving coil via a bobbin and is supported by support springs in such a manner as to perform reciprocating motion. A cylinder head connected to the housing forms a compression chamber at an end of the cylinder and compressed fluid is discharged from the compression chamber by the reciprocating motion of the piston. First and second cover plates are disposed at opposite ends of the housing to form a sealed container with the housing.

10 Claims, 8 Drawing Sheets

VIBRATING COMPRESSOR

FIELD OF THE INVENTION

This invention relates generally to a vibrating compressor, and more specifically to a vibrating compressor whose component members are easy to manufacture and assemble at reduced manufacturing cost, and also to a vibrating compressor in which an electrical path is maintained by using mechanical component members without using lead wires that are prone to cause electrically poor contact, breakage, etc. due to its construction.

DESCRIPTION OF THE PRIOR ART

Vibrating compressors have heretofore been widely used as compressors for onboard refrigerators. In this type of vibrating compressor, as will be described with reference to a typical example shown in FIG. 5, a driving coil 116 which vibrates as driven in a magnetic field, and a piston 118 which reciprocates in accordance with the vibration of the driving coil 116 are disposed in series in the longitudinal direction. With this arrangement, this type of vibrating compressor is generally of a slender shape.

By improving this point, the present inventor invented a vibrating compressor having the construction shown in FIG. 1 and filed Japan Patent Application No. 258366/1993.

In FIG. 1, a compressor proper 1 is supported resiliently via springs 3 and 4 in a sealed container 2 comprising a housing 2d and a cover plate 2c for closing the upper open end of the housing 2d. Numeral 31 denotes a yoke consisting of hollow cylindrical inner and outer tubes 32 and 33, both concentrically and integrally formed with an end plate 34 disposed at the upper end of the inner and outer tubes 32 and 33.

Numeral 35 denotes a permanent magnet formed into a hollow cylindrical or cross-sectionally circular arc shape and fixedly fitted to the inner circumferential surface of the outer tube 33. A cup-shaped yoke cap 36 is fixedly fitted to the lower part of the outer tube 33 to close the lower open end of the yoke 31.

Numeral 37 denotes a cylinder having an integrally formed flange 38 at the upper end thereof and engaged with the inside of the inner tube 32. In the cylinder 37 provided is a hollow cylindrical piston 15 having an intake valve 14 at the upper end thereof in such a manner as to reciprocate in the axial direction of the cylinder 37.

At the lower end of the piston 15 fixedly fitted is a supporting member 16 to which a hollow cylindrical driving coil 17 disposed between the inner tube and the permanent magnet 35 is fixedly fitted. Support springs 18 and 19 are provided above and below the supporting member 16. Numeral 39 and 40 are insulating rings interposed between the support spring 18 and the inner tube 32, and between the support spring 18 and the supporting member 16, respectively.

Next, numeral 41 denotes a cylinder head fixedly fitted to the flange 38 at the upper end of the cylinder 37 via a ring-shaped gasket 42 to form a compression chamber 43. The compression chamber 43 is connected to a discharge tube 26 in such a manner that compressed fluid can flow. Numeral 44 denotes an outer electrode provided on the sealed container 2 for supporting a power-feeding electrode 45 in an insulated and airtight manner. The electrode 45 on the outer electrode 44 and the driving coil 17 are electrically connected to each other via a lead wire 46, the support spring 18, a lead wire 47, the driving coil 17, the supporting member 16, the support spring 19, the yoke cap 36, the support springs 4 and 3, and the housing 2d.

With the above construction, as alternating current is fed to the driving coil 17, the piston 15 performs pumping action, causing compressed fluid to discharge from the discharge tube 26.

Numeral 29 denotes a discharge valve, 22 a spring, 23 an air intake and oil feeding tube, 24 a riser part, 25 an oil feeding part, 26 a discharge tube, 27 an intake tube, and 28 lubricating oil, respectively.

In the construction shown in FIG. 1 where the piston 15 is disposed in an inside space formed by the driving coil 17, as described above, the vibrating compressor can be formed into a low profile. In the construction shown in FIG. 1 where the compressor proper 1 is resiliently supported in the sealed container 2 via the springs 3 and 4, however, the sealed container 2 has to be provided separately, leading to increased cost. In addition, there are some other problems to be improved.

SUMMARY OF THE INVENTION

It is an object of this invention to omit the sealed container 2 shown in FIG. 1 by forming a sealed container with the outer tube and cover plate of the compressor proper.

It is another object of this invention to provide a vibrating compressor whose component members are easy to manufacture and assemble at reduced manufacturing cost.

It is still another object of this invention to provide a vibrating compressor in which a supporting member 16 is fixedly fitted to the lower end of a piston 15, and an electrical path is maintained via the supporting member 16 using mechanical component members without using lead wires.

It is a further object of this invention to provide a vibrating compressor in which a drive coil can be wound easily.

DETAILED DESCRIPTION OF THE EMBODIMENT

Figure 1:
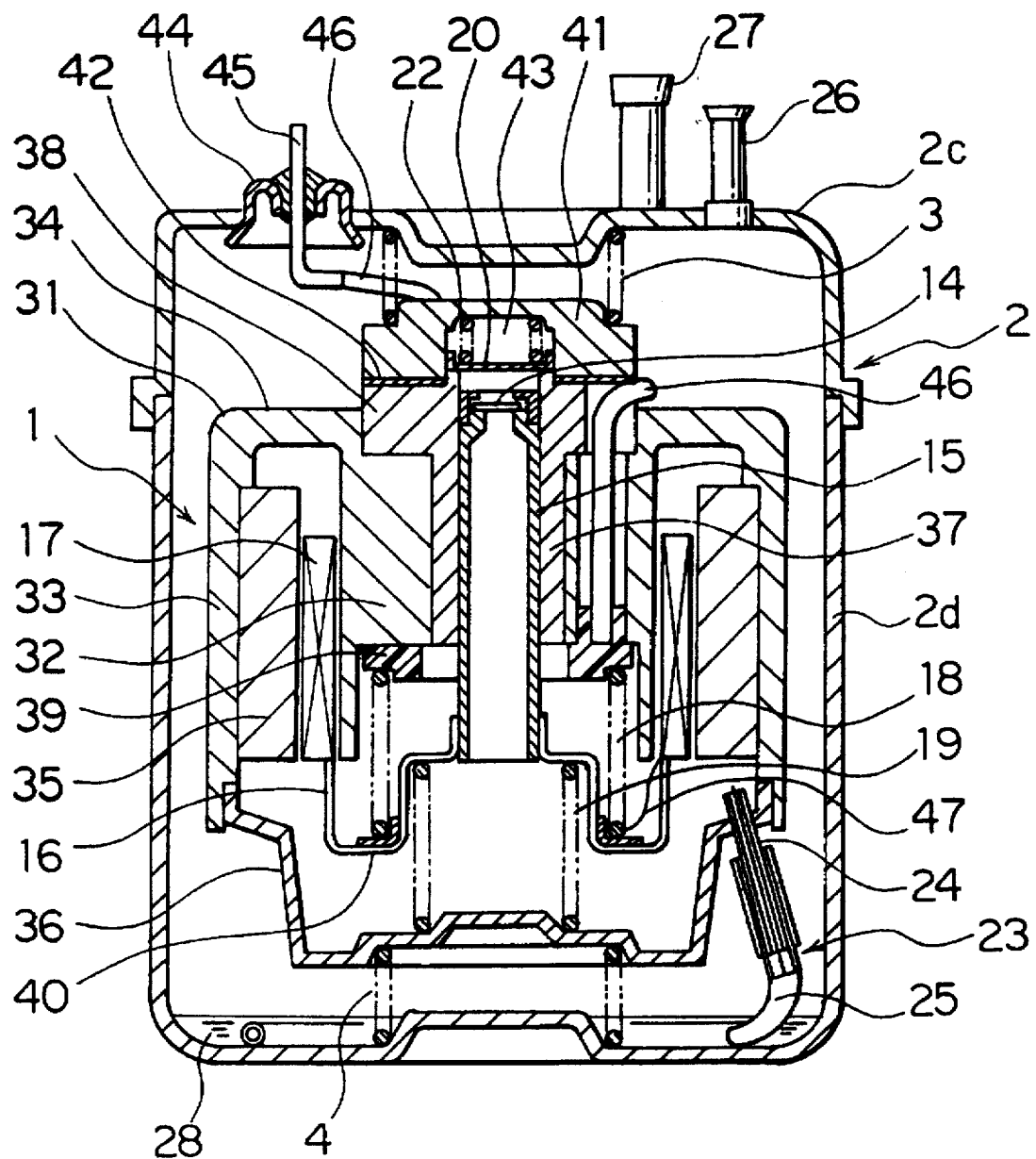
FIG. 1 shows a prior-art vibrating compressor.

The construction shown in FIG. 1 that was previously proposed by the present inventor has an advantage that the vibrating compressor can be formed into a low profile. In completing a commercially marketable vibrating compressor, however, there is much room for improvement in terms of construction and manufacturing cost.

Figure 2:
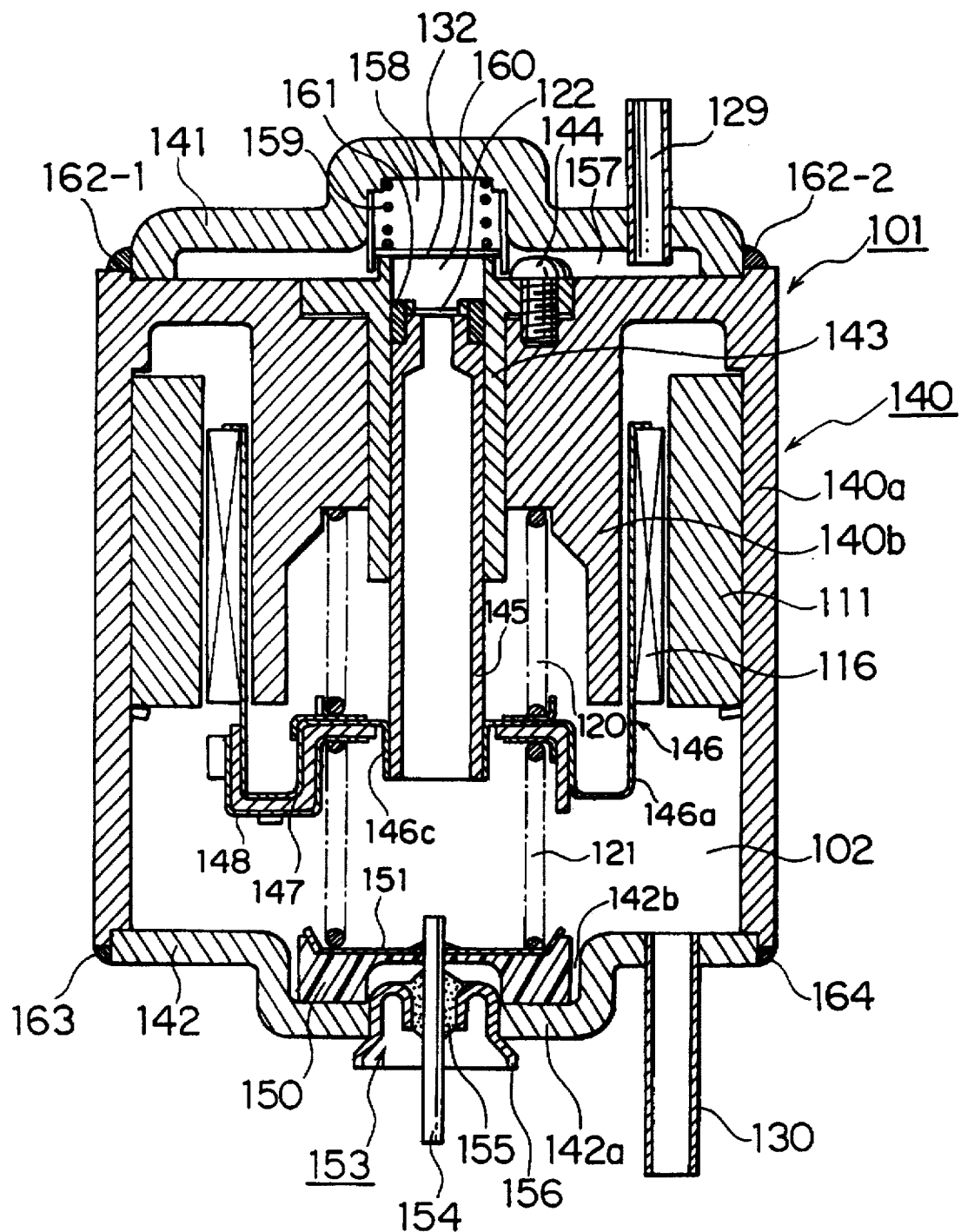
FIG. 2 shows a vibrating compressor embodying this invention.

FIG. 2 shows a vibrating compressor embodying this invention. FIG. 2 also discloses that an electrical path is maintained in the internal construction without using lead wires.

Unlike the prior-art double sealed construction shown in FIG. 1, the vibrating compressor 101 according to this invention shown in FIG. 2 has a construction dispensing with the sealed container 2 shown in FIG. 1. In the vibrating compressor shown in FIG. 2, a sealed container 102 is constructed of a double cylinder-shaped housing 140 having an open end at one end and a bottomed end at the other, and cap-shaped cover plates 141 and 142 fitted to both ends of the housing 140 to maintain airtightness. The housing 140 comprises integrally formed outer and inner cylinders or tubes 140a and 140b. The outer and inner cylinders or tubes are joined by an end plate. The outer and inner cylinders or tubes 140a and 140b may not necessarily be integrally formed. They may be fabricated separately and joined together by an appropriate joining means which functions as an endplate.

The outer cylinder or tube 140a of the housing 140 serves as a yoke and a casing. On the inner circumferential surface of the outer cylinder 140a fixedly fitted is a circular arc-shaped permanent magnet 111. At the central part of the inner cylinder or tube 140b provided in the axial direction is a cylinder 143 which is fixedly fitted to the inner cylinder 140b with a plurality of screws 144.

Inside the cylinder 143 engaged is a cylindrical piston 145, an end of which is fixed to the cylindrical portion 146c of a bobbin 146 according to this invention, which will be described later. A driving coil 116 is wound on the bobbin 146 and disposed in a space between the permanent magnet 111 and the inner circumferential surface of the inner cylinder 140b so that the driving coil 116 is allowed to reciprocate vertically in accordance with the reciprocating motion of the piston 145.

Figure 7:
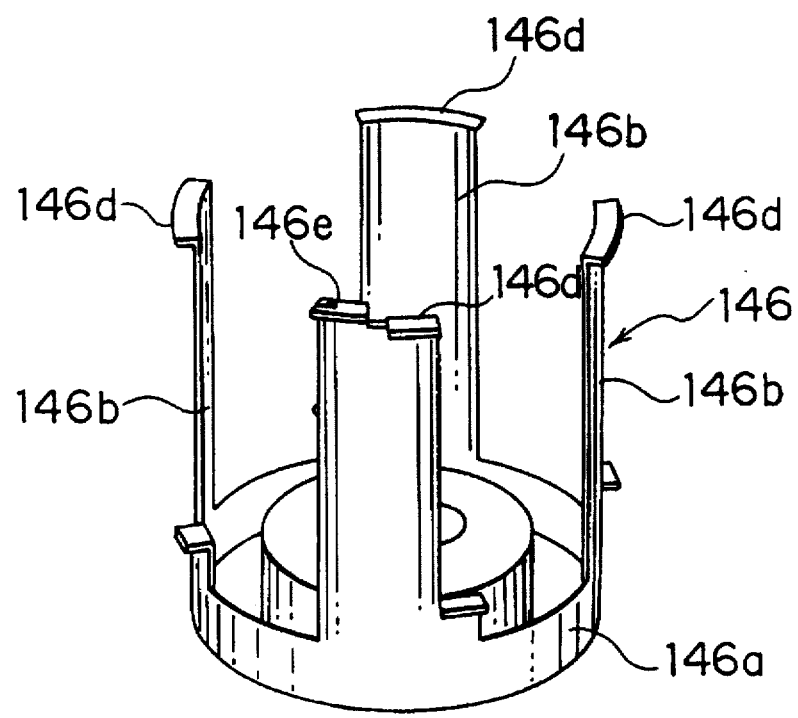
FIG. 7 is a perspective view of a bobbin used in FIG. 6.
Figure 8:
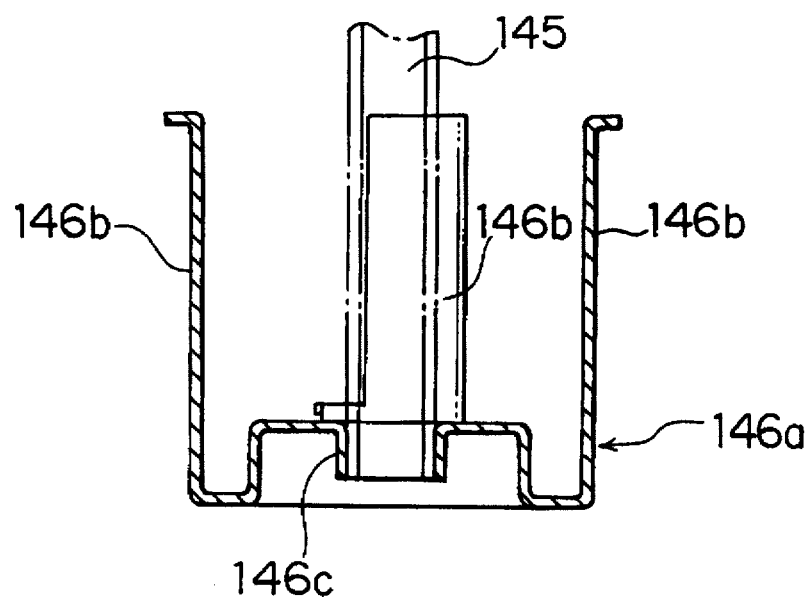
FIG. 8 shows an embodiment of this invention illustrating the manner in which a bobbin and a piston are connected to each other in the construction shown in FIG. 6.

The bobbin 146 is made of an electrically conductive material and comprises four coil yoke pieces 146b, a flange portion 146a formed integrally with the coil yoke pieces 146b, and a cylindrical portion 146c connected to the flange portion 146a and fixedly fitted to an end of the piston 145, as shown in FIGS. 7 and 8. The driving coil 116 is wound on the bobbin 146 while being supported by the four coil yoke pieces 146b. The number of coil yoke pieces 146b is not limited to four, and may of course be any plural number.

Each of the coil yoke pieces 146b has bent portions 146d at the upper and lower parts thereof for retaining the coil ends of the driving coil 116 to prevent the wound driving coil 116 from loosening. In FIG. 7, the bent portion 146d provided at the lower part of the driving coil 116 is not disposed immediately beneath the bent portion 146d at the upper part, but the arrangement of the bent portions 146d may not be limited to that shown in the figure. The bent portion 146d at the lower part of the coil yoke piece 146b may be provided immediately beneath the bent portion 146d at the upper part of the coil yoke piece 146d by lancing and raising.

At least one of the bent portions 146d at the upper part has a slit groove 146e for holding a leading end of the driving coil 116 fed by an automatic coil winding machine.

Although there may be various methods of winding a driving coil 116 on the bobbin 146 having such a construction, one method is such that an insulating member 147 is provided on the flange portion 146a of the bobbin 146 and an electrically conductive terminal 148 is mounted on the insulating member 147, as shown in FIG. 2, before the driving coil 116 is wound on the bobbin 146, for example.

Figure 5:
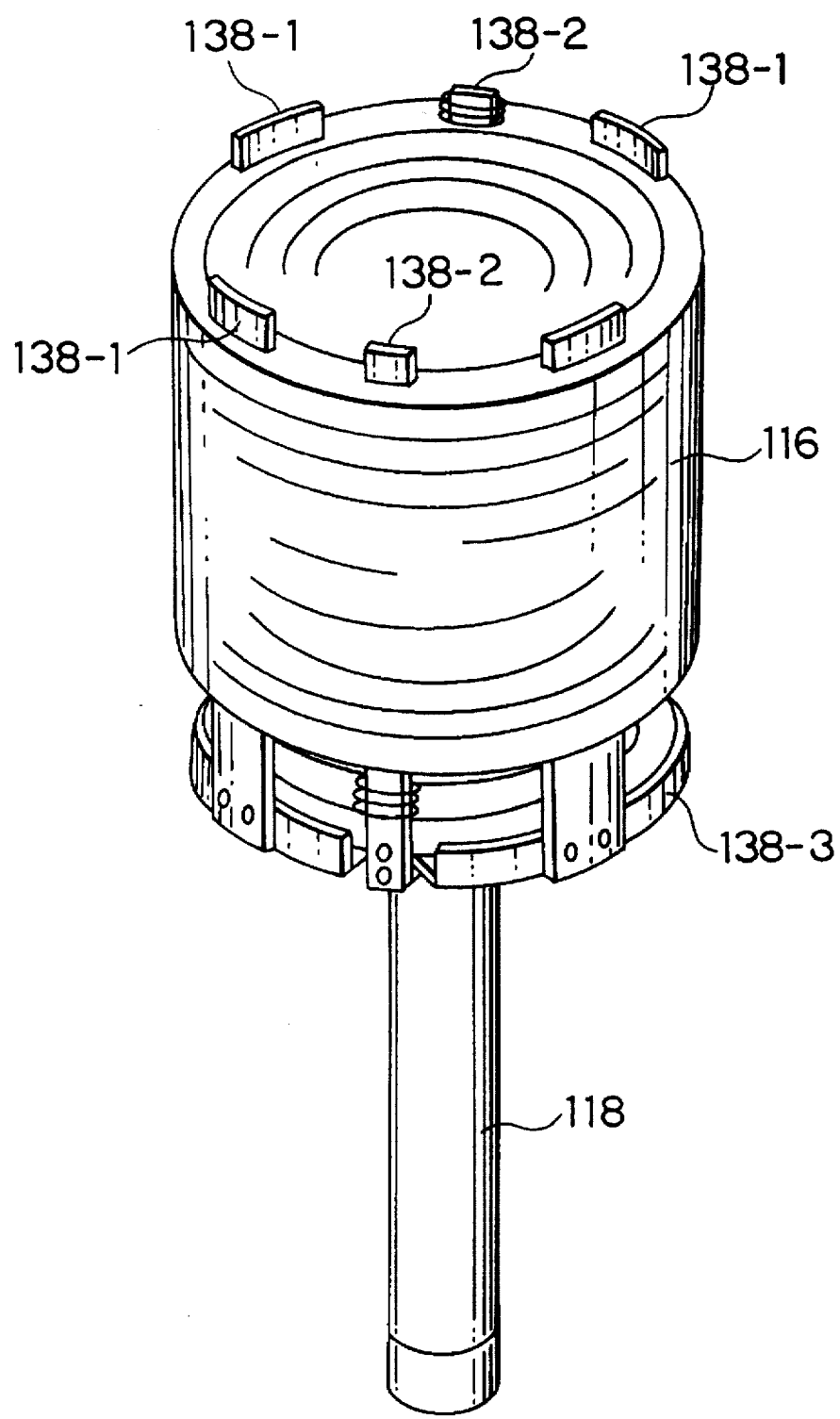
FIG. 5 shows a prior-art construction illustrating the relationship between a driving coil and a piston.

FIG. 5 shows a prior-art construction illustrating the relationship between the driving coil and the piston. Although FIG. 5 shows a type having a construction where a piston 118 is disposed beneath the driving coil 116, unlike the construction shown in FIG. 1, the figure is not intended to illustrate the relative positions of the driving coil and the piston, but is intended to illustrate the construction of the driving coil 116 shown in FIG. 5.

The driving coil 116 as shown in FIG. 5 has heretofore been wound in the following manner: First, part of the driving coil 116 is wound as an inner part on a winding jig having a predetermined diameter, and winding operation is suspended upon completion of the winding of the inner part of the driving coil 116. Four reinforcing coil yoke pieces 138-1 and two terminal pieces 138-2 are manually positioned, and then the remainder of the driving coil 116 is wound as an outer part on the inner part. Thus, predetermined turns of the driving coil 116 are wound with the four reinforcing coil yoke pieces 138-1 and the two terminal pieces 138-2 interposed between the inner and outer parts. Leading and trailing ends of the driving coil 116 are wound and electrically connected to the two terminal pieces 138-2.

After that, a flange portion 138-3 is spot-welded to the ends of the coil yoke pieces 138-1 and the terminal pieces 138-2, and varnish is applied to the coil surface for solidification after the winding jig has been removed to prevent the driving coil 116 from loosening. An end of the piston 118 is welded to the flange portion 138-3 to substantially integrate the piston 118 and the driving coil 116 into one unit.

In the prior-art method of manufacturing the driving coil 116 by interposing coil yoke pieces 138-1 and terminal pieces between the inner and outer parts of the driving coil 116 to maintain the strength of the driving coil 116, winding operation has had to be suspended to interpose the coil yoke pieces 138-1 and the terminal pieces 138-2. In addition, manual positioning of the coil yoke pieces 138-1 and the terminal pieces 138-2 has prevented the automatic winding of the driving coil 116. Furthermore, connecting the flange portion 138-3 to the coil yoke pieces 138-1 and the terminal pieces 138-2 by spot welding, for example, has impaired work efficiency.

The construction of the bobbin described with reference to FIGS. 7 and 8 is intended to overcome the shortcomings of the prior-art construction shown in FIG. 5.

After the completion of the preparation described in reference to FIGS. 7 and 8, a winding jig having an outside diameter corresponding to the inside diameter of the coil yoke piece 146b is inserted into the bobbin 146, and a leading end of the driving coil is caused to engage with the slit groove 146e of the bobbin 146 by the automatic coil winding machine. Predetermined turns of the driving coil 116 are wound on the bobbin 146. The trailing end of the driving coil 116 is electrically connected to the terminal piece 148a of a terminal 148. The bobbin 146 is removed from the winding jig, varnish is applied to the surface of the driving coil 116 for insulation and solidification, and then the piston 145 is inserted into the cylindrical portion 146c and fixedly fitted by welding.

Although the piston 145 is welded to the bobbin 146 after the driving coil 116 has been wound on the bobbin 146 in the above description, the piston 145 may be welded in advance to the bobbin 146 before the driving coil 116 is wound on the bobbin 146. There may be other various methods of winding the driving coil 116 on the bobbin 146.

Figure 6:
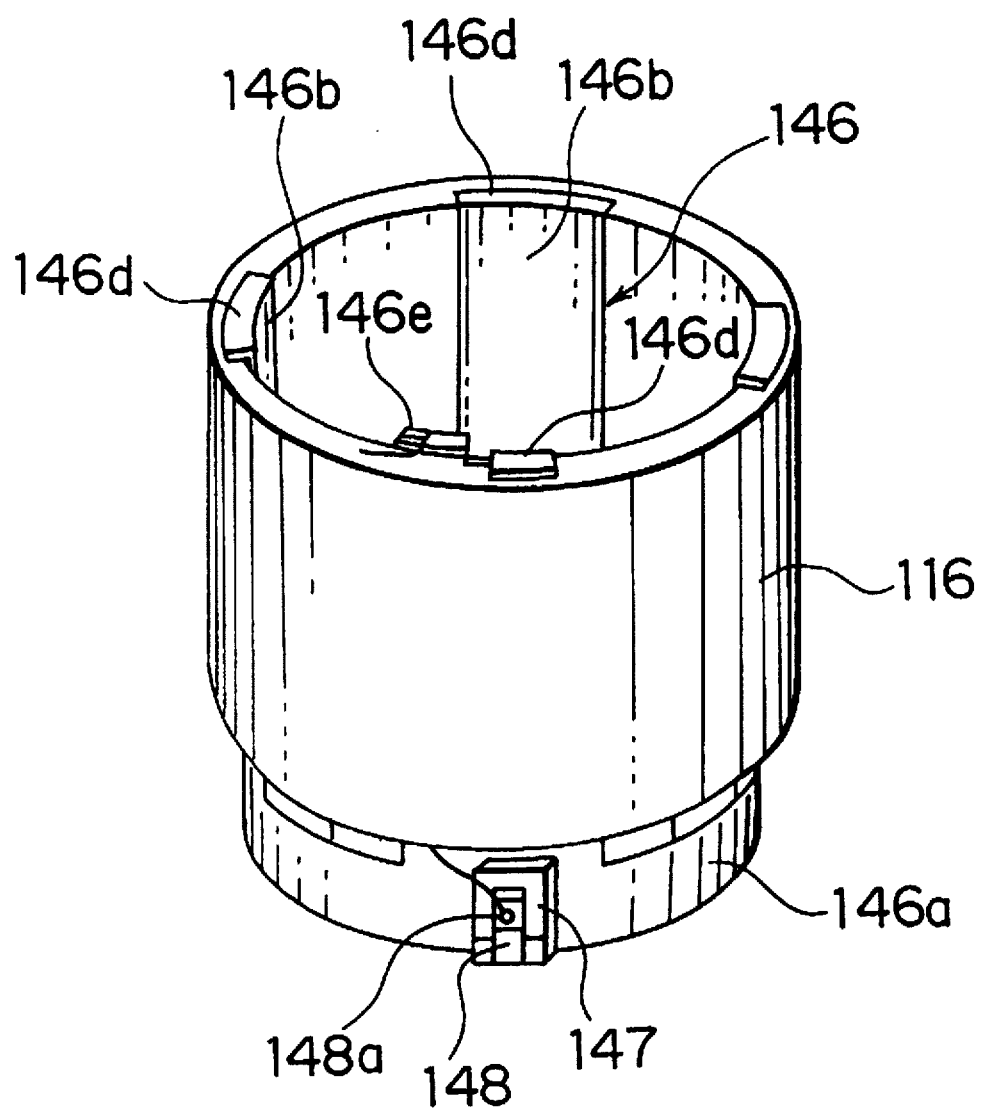
FIG. 6 shows a construction of an embodiment of this invention in which the construction shown in FIG. 5 has been improved.

FIG. 6 shows the construction of an embodiment of this invention using a bobbin of the construction described in reference to FIGS. 7 and 8. The driving coil 116 is wound on the bobbin 146 shown in FIG. 7. In the construction shown in FIG. 6, the shortcoming described in reference to FIG. 5, that is, the troublesome manual positioning of the coil yoke pieces 138-1 and the terminal pieces 138-2 during the winding of the driving coil 116 has been solved.

An insulating member 147 is provided on the flange portion 146a of the bobbin 146, and an electrically conductive terminal 148 is provided on the surface of the insulating member 147. A leading end of the driving coil 116 wound on the coil yoke piece 146b is connected to any one of the coil yoke piece 146b, and the trailing end thereof is connected to the terminal piece 148a of the terminal 148.

As shown in FIG. 2, a support spring 120 is provided between the flange portion of the bobbin 146 and the inner cylinder 140b of the housing 140, and a support spring 121 is provided between the terminal 148 provided on the flange portion 146a of the bobbin 146 via the insulating member 147, and a washer terminal 151 provided on a cap-shaped cover plate 142 via an insulation base 150; both ends of the support spring 121 being electrically connected by surface contact to the terminal 148 and the washer terminal 151. In this way, the piston 145 is supported by a pair of upper and lower support springs 120 and 121.

Figure 3:
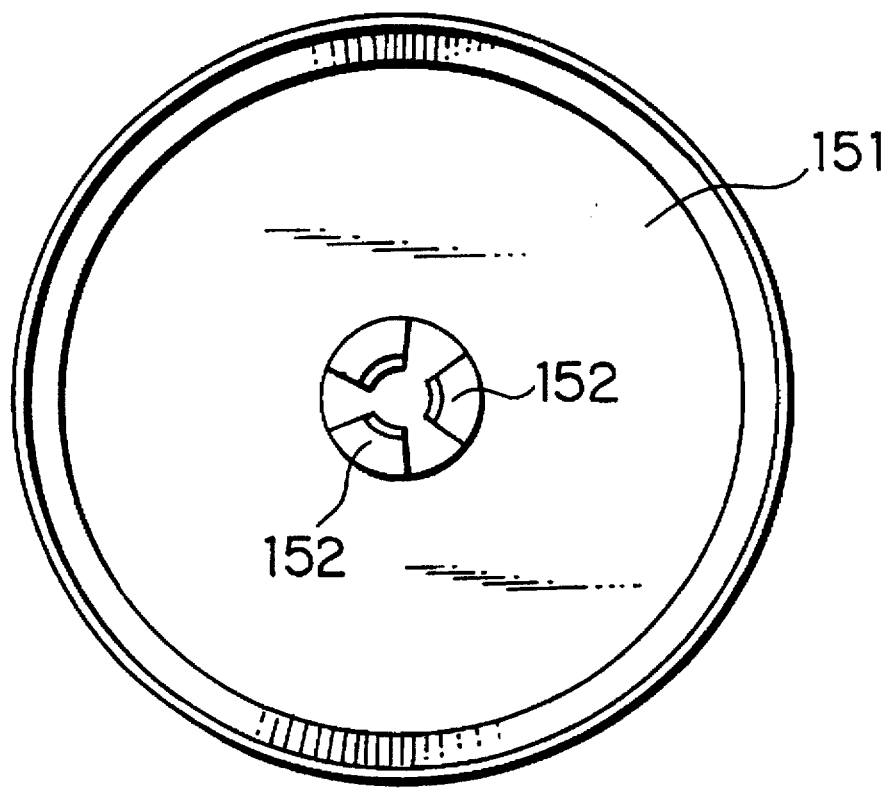
FIG. 3 is a front view of the washer terminal shown in FIG. 2.
Figure 4:
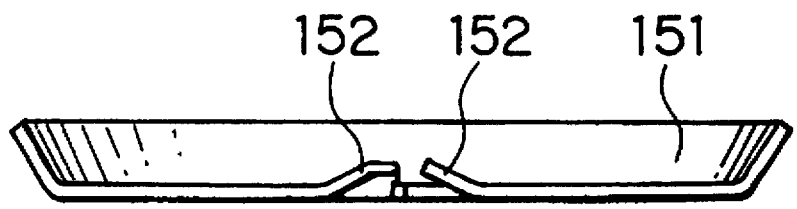
FIG. 4 is a cross-sectional view of the washer terminal shown in FIG. 2.

The washer terminal 151 is an electrically conductive disc-shaped member at the central part of which a plurality of (three, for example) lanced and raised pawls 152 are formed, as shown in FIGS. 3 and 4, front and cross-sectional views of the washer terminal shown in FIG. 3. A rod-shaped electrically conductive member, when inserted into the lanced and raised pieces 152, is mechanically secured in position and electrically connected to the lanced and raised pawls 152 in a so-called push-nut manner. The flat bottom part of the disc-shaped washer terminal 151 comes in surface contact with an end of the support spring 121. The pawls of the disc-shaped washer terminal 151 may be of various shapes, including flat- and cylindrical shapes. Methods of fixedly fitting an electrically conductive rod-like member to the washer terminal 151 may include welding, soldering and other means.

The cap-shaped cover plate 142 for closing an open end of the housing 140 has at the central part thereof a protrusion 142a having a hermetically sealed terminal 153. An outer terminal 156 is electrically connected to the cover plate 142, and the outer terminal 156 and a center terminal 154 are insulated by an insulating member 155 made of a glass material. Both ends of the center terminal 154 protrude from the cover plate 142, and the electrically conductive washer terminal 151 is disposed in a circular recess 142b formed by the protrusion 142a at the central part of the cover plate 142 via the aforementioned insulation base 150. Both the washer terminal 151 and the center terminal 154 are electrically and mechanically connected and secured in position in the push-nut manner. An intake tube 130 is installed on the cover plate 142.

The bottomed end of the housing 140 is covered by a cap-shaped cover plate 141 that forms a space 157 and has a discharge tube 129 and a projection at the central part thereof. The projection at the central part of the cover plate 141 forms a discharge valve chamber 158, in which a spring 159 that is preloaded in the direction to push a discharge valve 132 disposed at an end of a cylinder head forming the cylinder chamber 160. The cylinder-side construction of the piston 145 is such that a piston head 161 is press-fitted to the piston 145, and an intake valve 122 is disposed between the piston head 161 and the piston 145.

With this construction, when an alternating voltage is applied across the center terminal 154 and the outer terminal 156 of the hermetically sealed terminal 153, an alternating current flows in an electrical path comprising the center terminal 154, the washer terminal 151, the support spring 121, the terminal 148, the driving coil 116, the bobbin 146, the support spring 120, the inner cylinder 140b, the outer cylinder 140a and the outer terminal 156.

Thus, the driving coil 116 disposed in the magnetic field of the permanent magnet 111 vibrates vertically in accordance with the polarity of the alternating current. The piston 145 that is substantially integrated with the driving coil 116 also reciprocates vertically together with the driving coil 116. The vertical reciprocating motion of the piston 116 is amplified by pairs of upper and lower support springs 120 and 121. The intake and discharge valves 122 and 132 performs pumping action in accordance with the amplified vertical reciprocating motion of the piston 116, causing a gas, such as a refrigerant introduced in the sealed container 102 via the intake tube 130, to flow into the discharge valve chamber via the piston 145, the intake valve 122, the cylinder chamber 160 and the discharge valve 132. Then, the compressed gas, such as a refrigerant, is discharged into a refrigerator condenser via the space 157 and the discharge tube 129.

In FIG. 2, the sealed container 102 is sealed in the following manner. That is, the circumferential joint parts of the housing 140 and the cover plate 141 are welded together along the circumference thereof, as numerals 162-1 and 162-2 indicate weldments. The circumferential joint parts of the housing 140 and the cover plate 142 are also welded together along the circumference thereof, as numerals 163 and 164 indicate weldments.

As described above, this invention has such a construction that the outer wall of the vibrating compressor proper is constructed of the outer cylinder 140a and the cover plates 141 and 142 by omitting the sealed container 2 shown in FIG. 1. In the following, some additional improvements as to the supporting arrangements for the permanent magnet and the cylinder will be described, referring to FIG. 1.

The permanent magnet 35 is normally fixedly fitted to the inner circumferential surface of the outer tube 33 with adhesive.

In refrigerant compressors for onboard refrigerators where resistance to chlorofluorocarbon, oil and heat is required, adhesive of special specifications has to be used. In practice, such adhesive, after applied to the boundary surfaces between the outer tube 33 and the permanent magnet 35, has to be placed in a 150° C. oven for more than 5 hours, for example, for curing. Furthermore, after the compressor proper is extracted from the oven, the time to cool the compressor proper is required. This makes it inevitable to adopt the batch production system, rather than the assembly line system, resulting in frequent interruption of manufacturing processes and increased in-process products. Since the adhesive used tends to overflow from the boundary surface, it may be necessary to wipe off the excess adhesive, requiring additional processes and increased manufacturing cost. The method of bonding the permanent magnet to the outer tube with adhesive can of course be used in conjunction with other appropriate means as necessary.

Figure 11:
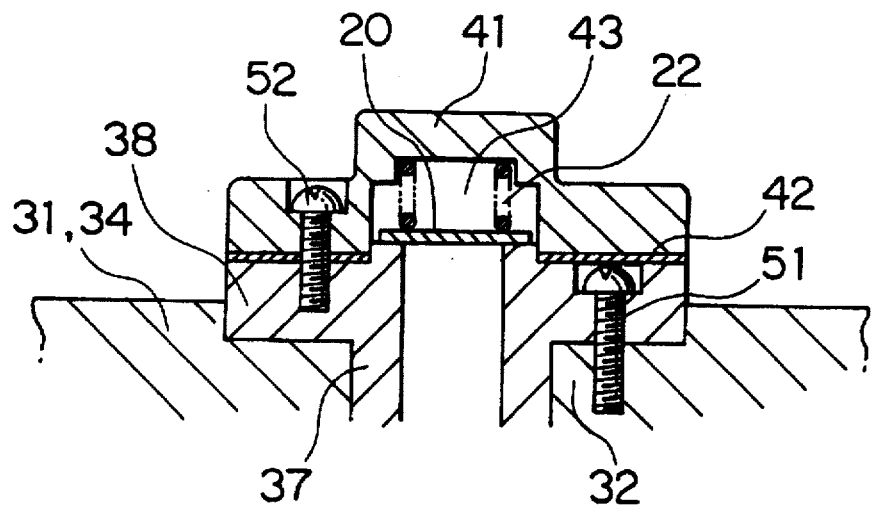
FIG. 11 is an enlarged longitudinal sectional view illustrating the manner in which a cylinder head is fixedly fitted to a cylinder in the prior art shown in FIG. 1.

The method of fixedly fitting the cylinder head 41 to the cylinder 37 to form a compression chamber 43 is also a troublesome operation. FIG. 11 is an enlarged longitudinal sectional view illustrating the state where the cylinder head 41 is fitted to the cylinder 37 in FIG. 1. In FIG. 11, the cylinder 37 is first inserted end positioned in the inner tube 32, and then fastened to the inner tube 32 using three mounting screws 51, for example. After that, a gasket 42 formed into a ring shape is placed on the flange 38, and the cylinder head 41 equipped with the discharge valve 20 and the spring 22 is placed on the flange 38, positioned and fastened to the flange 38 with three mounting screws 52, for example.

This means that the fastening operation in the prior art has required a total of six mounting screws 51 and 52, and six corresponding female threads to be provided on the yoke 31 and the flange 38. Moreover, the prior art has used a distortion-free gasket called a joint seal for high pressure use, made of fibers, such as asbestos fibers, bonded by a rubber-based material to maintain airtightness in the compression chamber 43. This has required high-strength screws with a tensile strength of 120 kg/cm² as the mounting screws 52. The need for this large fastening power has made mounting operation extremely troublesome.

In the vibrating compressor shown in FIG. 1, power is fed to the driving coil 17 via an electrical path comprising the power-feeding electrode 45, the lead wire 46, the support spring 18, the lead wire 47, the driving coil 17, the supporting member 16, the support spring 19, the yoke cap 36, the support springs 4 and 3, the housing 2d and the outer terminal 44. In this arrangement, there is a fear of breakage of the lead wires 46 and 47.

In the following, arrangements according to this invention that can solve the aforementioned problems will be described.

Figure 9:
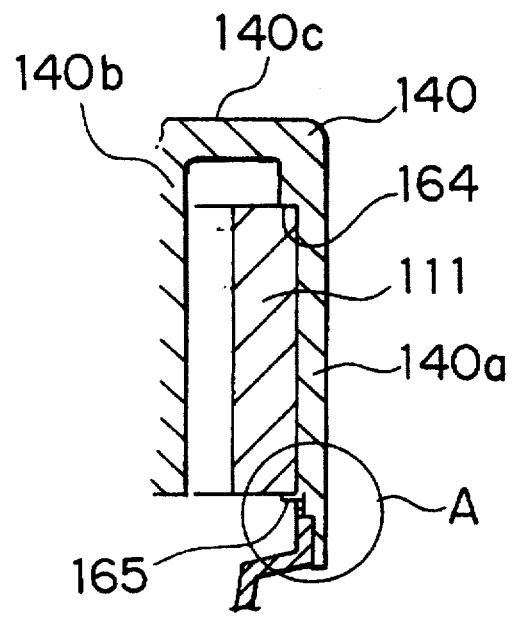
FIG. 9 is a longitudinal sectional view illustrating an embodiment of this invention supporting a permanent magnet.
Figure 10:
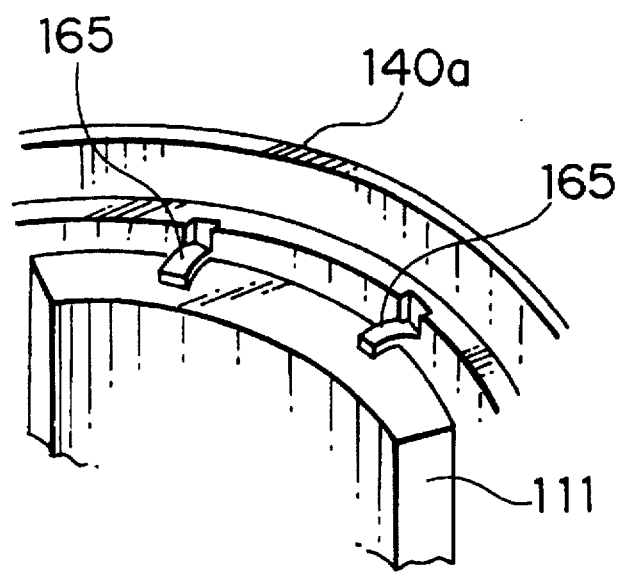
FIG. 10 is an enlarged perspective view of part A in FIG. 9.

FIG. 9 is a longitudinal sectional view of an embodiment of this invention for supporting a permanent magnet, and FIG. 10 is an enlarged perspective view of part A in FIG. 9. Like parts are indicated by like numerals used in FIG. 2. In FIGS. 9 and 10, numeral 164 denotes a shouldered part provided on the side of the end plate 140c of the outer cylinder 140a, against which the upper end face of the permanent magnet 111 is butted. Numeral 165 denotes a lanced and raised piece provided on the side of the open end of the outer cylinder for making contact with the lower end faceof the permanent magnet 111 to hold the permanent magnet 111 in position.

When the permanent magnet 111 is formed into a cross-sectional circular arc shape with a central angle of less than 120°, for example, about two lanced and raised piece 165 are provided for one permanent magnet 111. These lanced and raised pieces 165 can be easily formed by lancing and raising part of the outer cylinder 140a using a tool having a chisel-like cutting edge, for example.

With the aforementioned construction, the permanent magnet 111 can be fixedly fitted to the inner circumferential surface of the outer cylinder 140a without using adhesive of special specifications as has been required in the prior art, and the need for wiping off excess adhesive after fastening can be eliminated. Needless to say, this fastening method can be used in conjunction with the fastening method using adhesive. Since the permanent magnet 111 formed in a cross-sectional circular arc or ring shape is magnetized in the radial direction, producing magnetic attraction with the outer cylinder 140a made of a magnetic material, such as steel, the permanent magnet 111 can be positioned and secured in place reliably only with an axial pushing force against the shouldered portion 164 exerted by the aforementioned lanced and raised pieces 165.

FIG. 11 is an enlarged longitudinal sectional view illustrating the state where the cylinder head and cylinder shown in FIG. 1 showing the prior art are joined together. Like parts are indicated by like numerals used in FIG. 1. Numerals 51 and 52 denotes screws, respectively.

In the prior-art construction shown in FIG. 11, a hole for receiving the flange 38 of the cylinder 37 is provided on the upper part of the yoke 31. The flange 38 is inserted into the hole and fixedly fitted to the yoke 31 using a plurality of (or three, for example) screws 51. Furthermore, the gasket 42 is disposed on the upper surface of the flange 38 of the cylinder 37, and then the cylinder head 41 is placed on the gasket 42 and fixedly fitted to the flange 38 with the screws 52.

Thus, the prior-art construction shown in FIG. 11 has required a total of six screws.

Figure 12:
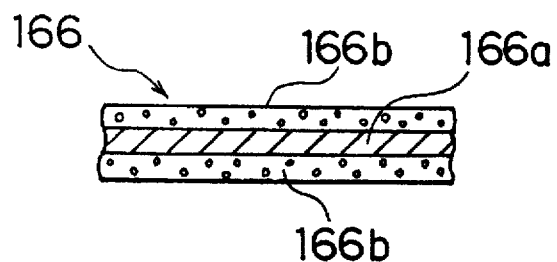
FIG. 12 is an enlarged cross-sectional view of a gasket embodying this invention.

FIG. 12 is an enlarged cross-sectional view of a gasket 166 according to this invention. In FIG. 12, numeral 166a denotes a sheet material, such as steel, or SPCC, for example, or aluminum, or aluminum alloy, formed into a disc shape. Numeral 166b denotes a seal layer made of a flexible elastic material such as foamed rubber, deposited on both surfaces of the sheet material 166a.

The gasket 166 having the aforementioned construction is interposed between the cylinder flange 143a and the end plate 140c of the outer cylinder 140a to fixedly fit the cylinder 143 to the housing 140.

Figure 13:
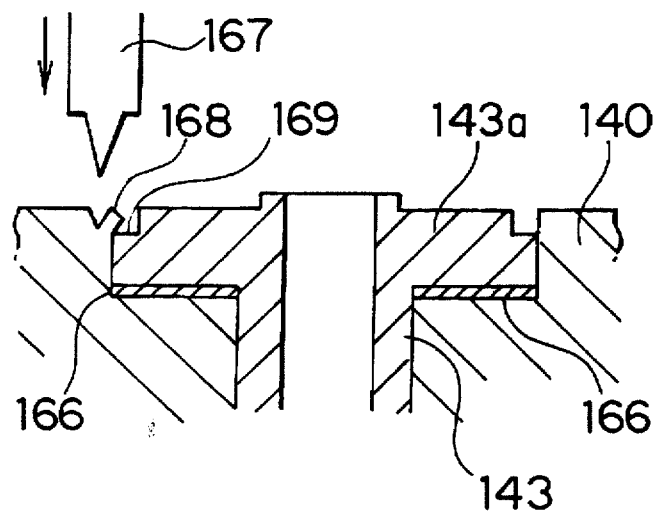
FIG. 13 is an enlarged longitudinal sectional view illustrating a cylinder supporting construction embodying this invention.

FIG. 13 is an enlarged longitudinal sectional view of an embodiment of this invention illustrating a construction for supporting the cylinder. In FIG. 13, at least part of the flange 143a of the cylinder 143 is provided in such a manner as to be embedded in the end plate of the housing 140, preferably with the upper end face of the flange 143a substantially flush with the upper end face of the housing 140. Numeral 169 denotes a recess, a plurality of which are provided on the upper surface of the circumferential edge of the flange 143a.

After the cylinder 143 having the aforementioned construction is inserted into the inner cylinder 140b of the housing 140, lanced and raised portions 168 are formed by a tool 167 having a chisel-like edge at locations corresponding to the recesses 169. The cylinder 143 is fixedly fitted to the inner cylinder 140b by engaging the lanced and raised portions 168 with the recesses 169. With this arrangement, the need for mounting screws for fixedly fitting the cylinder 143 to the housing 140 as have been used in the prior-art construction can be eliminated, leading to reduced manufacturing cost.

As described above, this invention can accomplish cost reductions by improving various parts of a prior-art vibrating compressor as described in reference to FIG. 1, and by using the compressor proper also as the sealed container. Furthermore, unwanted breakage of electrical circuits can be reduced by accomplishing electrical connections within the compressor without using lead wires.

What is claimed is:

1. A vibrating compressor comprising:

a housing having an inner tube and an outer tube formed concentrically, said inner tube being connected with said outer tube via an end plate, said end plate being disposed at one axial end of said inner tube and said outer tube to form a housing closed end and a housing open end;

a permanent magnet fixedly fitted to an inner circumferential surface of said outer tube;

a driving coil provided in a gap between said permanent magnet and said inner tube;

a cylinder fitted to an inside of said inner tube;

a hollow piston equipped with a valve and inserted into said cylinder;

a bobbin with support springs, said hollow piston being connected to said driving coil via said bobbin and supported by said support springs in such a manner as to perform reciprocating motion;

a cylinder head connected to said housing to form a compression chamber at an end of said cylinder on a side into which said hollow piston is not inserted, whereby compressed fluid is discharged from said compression chamber by the reciprocating motion of said piston;

a first cover plate disposed on said housing open end of said outer tube for closing said open end;

a second cover plate disposed on said housing closed end, whereby a sealed container is formed by said outer tube, said first cover plate and said second cover plate to serve as an outer wall of the vibrating compressor;

weld connection means for fixedly fitting said first cover plate and said second cover plate to said outer tube in an airtight state.

2. A vibrating compressor as set forth in claim 1, further comprising: an intake tube for introducing refrigerant fluid into said sealed container is fixedly fitted to one of said first cover plate and said second cover plate.

3. A vibrating compressor as set forth in claim 1, further comprising: said driving coil being wound on said bobbin, said bobbin having a flange and including a plurality of coil yoke pieces made of an electrically conductive material for supporting said driving coil; and a cylindrical portion at which an end of said piston is fixedly fitted to said flange.

4. A vibrating compressor as set forth in claim 3, wherein said coil yoke pieces have bent portions for retaining a coil end of said driving coil at the upper and lower ends thereof.

5. A vibrating compressor as set forth in claim 4, wherein a slit groove for holding an end of said driving coil is provided on at least one of said bent portions provided on the upper end said coil yoke pieces.

6. A vibrating compressor as set forth in claim 1, wherein an electrical path is formed without using lead wires by providing an electrically conductive washer terminal for making surface contact with an end of said support spring, a hermetically sealed terminal is provided on one of said first and second cover plates of said vibrating compressor, an insulation base provided between said washer terminal and said cover plate, and a connecting mechanism for connecting a center terminal of said hermetically sealed terminal to said washer terminal.

7. A vibrating compressor as set forth in claim 6, wherein said connecting mechanism for connecting said center terminal of said hermetically sealed terminal to said washer terminal is a push-nut type connecting mechanism with which said center terminal is electrically and mechanically connected, and said center terminal is held in position with said washer terminal by said push-nut type connecting mechanism.

8. A vibrating compressor as set forth in claim 1, wherein a flange is formed on an end of said cylinder on a side of said cylinder head; a ring-shaped gasket is interposed between said flange and said housing end plate; said gasket formed by depositing a sealing layer made of a flexible elastic material on both sides of a sheet material made of a metallic material.

9. A vibrating compressor as set forth in claim 1, wherein said permanent magnet is fixedly fitted to said outer tube by providing a shoulder part on said inner circumferential surface of said outer tube, said shoulder being positioned abutting an end plate side of said permanent magnet; a plurality of lanced and raised pieces on the open end side of said outer tube for engaging with another end of said permanent magnet.

10. A vibrating compressor as set forth in claim 1, wherein said cylinder is fixedly fitted to said housing end plate by forming a flange on an end of said cylinder adjacent said cylinder head, said flange being embedded in said housing end plate, and a plurality of lanced and raised portions positioned on an end face of said end plate adjacent an outer circumference of said flange, said lanced and raised portions engaging with an end face of said flange.

\* \* \* \* \*